(12) United States Patent
Shekhar et al.

(10) Patent No.: US 9,325,612 B2
(45) Date of Patent: Apr. 26, 2016

(54) DYNAMIC IPOE CLIPS SUBSCRIBER METHOD AND APPARATUS

(71) Applicant: TELEFONAKTIEBOLAGET L M ERICSSON (PUBL), Stockholm (SE)

(72) Inventors: Chandra Shekhar, Sunnyvale, CA (US); Joel L. Wittenberg, El Cerrito, CA (US); Sunny Wang, Sataroga, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/857,587

(22) Filed: Apr. 5, 2013

(65) Prior Publication Data

US 2014/0146818 A1    May 29, 2014

Related U.S. Application Data

(60) Provisional application No. 61/731,191, filed on Nov. 29, 2012.

(51) Int. Cl.
| | |
|---|---|
| *H04L 12/721* | (2013.01) |
| *H04L 12/741* | (2013.01) |
| *H04L 12/931* | (2013.01) |
| *H04L 29/12* | (2006.01) |
| *H04L 29/06* | (2006.01) |

(52) U.S. Cl.
CPC ............. *H04L 45/72* (2013.01); *H04L 45/745* (2013.01); *H04L 49/351* (2013.01); *H04L 61/2571* (2013.01); *H04L 61/2015* (2013.01); *H04L 63/0892* (2013.01)

(58) Field of Classification Search
CPC ... H04L 45/72; H04L 45/745; H04L 12/4641; H04L 45/74; H04L 45/04; H04L 45/02; H04L 45/742; H04L 43/10; H04L 47/10; H04L 61/2571; H04L 61/2015; H04L 49/351; H04L 63/0892
USPC .............. 370/392, 389, 395.53, 235, 395.54, 370/465, 471, 437, 462, 397
See application file for complete search history.

(56) References Cited

U.S. PATENT DOCUMENTS

| | | | | |
|---|---|---|---|---|
| 5,752,003 | A * | 5/1998 | Hart | 709/223 |
| 6,795,433 | B1 * | 9/2004 | Li | 370/389 |
| 6,963,585 | B1 * | 11/2005 | Le Pennec et al. | 370/468 |
| 7,065,079 | B1 * | 6/2006 | Patra et al. | 370/390 |

(Continued)

OTHER PUBLICATIONS

Moy J., RFC 2328, "OSPF Version 2", Apr. 1998, the whole document.

(Continued)

*Primary Examiner* — Anh Ngoc Nguyen
*Assistant Examiner* — Ricardo Castaneyra

(57) ABSTRACT

Embodiments of the present disclosure include methods and apparatus for providing virtual channelization of un-channelized media. A parent circuit is configured to expect dynamic IPoE CLIPS clients. Traffic having a source address is received from an access point. A circuit lookup is performed based on the source address. Upon a determination from the circuit lookup that a circuit corresponding to the traffic from the source address does not exist, the parent circuit determines whether the source address of the traffic falls within a predefined range of addresses and notifies a control plane of the parent circuit that a new IP address has been detected for dynamic IPoE CLIPS.

19 Claims, 6 Drawing Sheets

(56) References Cited

U.S. PATENT DOCUMENTS

| | | | |
|---|---|---|---|
| 7,440,405 B2* | 10/2008 | Hsieh et al. | 370/235 |
| 7,660,259 B1* | 2/2010 | Grosser et al. | 370/252 |
| 2009/0210518 A1* | 8/2009 | Verma et al. | 709/220 |
| 2010/0303092 A1* | 12/2010 | Chinnaswamy et al. | 370/465 |
| 2013/0230047 A1* | 9/2013 | Subrahmaniam et al. | 370/392 |

OTHER PUBLICATIONS

SmarkEdge Os: "Ports, Circuits, and Tunnels Configuration Guide", Jan. 1, 2007, XP055097593, the whole document.

* cited by examiner (Prior Art: static CLIPS)

(Prior Art: dynamic DHCP CLIPS)

DYNAMIC IPOE CLIPS SUBSCRIBER METHOD AND APPARATUS

CROSS-REFERENCES TO RELATED APPLICATIONS

This application claims priority to U.S. Provisional Application Ser. No. 61/731,191, filed on Nov. 29, 2012, the entire disclosure of which is hereby incorporated herein by reference in its entirety.

FIELD

The present invention relates to operations occurring in a network element or network node. More particularly, the present invention relates to network elements or network nodes used to dynamically classify a subscriber based on a range of predefined addresses.

BACKGROUND

Broadband Network Gateway (BNG) routers currently support static and Dynamic Host Configuration Protocol (DHCP) Clientless Internet Protocol Services (CLIPS) subscribers (e.g., virtualized Internet Protocol over Ethernet (IpoE) subscribers). These mechanisms provide service selection to subscribers over non-channelized media and traffic accounting for such subscribers to service providers. Static CLIPS creates circuits (virtual channels) statically based upon manual configuration while DHCP CLIPS dynamically creates circuits based upon the DHCP protocol.

To illustrate, DHCP CLIPS is a mechanism to create a circuit (virtual channel) on demand and it is based upon the DHCP protocol. As a new subscriber negotiates an IP address (using DHCP), a circuit gets created for the subscriber on the BNG. So DHCP CLIPS is tightly coupled with the DHCP protocol.

FIG. 1 illustrates an example flow diagram of a prior art system using static CLIPS. At block 105, traffic is received at the BNG. At block 110, static CLIPS is used when a source IP address of traffic matches a pre-manual configured circuit. At block 115, the traffic is passed.

FIG. 2 illustrates an example flow diagram of a prior art system using dynamic DHCP CLIPS. At block 205, traffic is received at the BNG. At block 210, if traffic is a DHCP packet, the system processes a DHCP protocol message exchange and creates a new subscriber circuit. At block 215, the traffic is passed on a new circuit.

Current CLIPS functionality is dependent on either manual configuration or using the DHCP protocol. These dependencies limit its usefulness in situations where dynamic subscriber classification without DHCP protocol is desired. For example, a client may be assigned an IP address in a secured access network before reaching a BNG. Because an IP address is already assigned to the subscriber, the DHCP protocol is not used. In this case, the current CLIPS feature cannot be used to dynamically classify the subscriber for service selection and traffic accounting.

Thus, a need exists to overcome the problems with the prior art systems, designs, and processes as discussed above.

SUMMARY

Rather than classify subscribers based on either manual configuration or on the DHCP protocol, subscribers are classified based on a range of predefined addresses. In one embodiment, when receiving (on an appropriately configured parent circuit) the very first packet with a source address within the predefined address range, the BNG network element classifies the source address as belonging to a new subscriber and starts service selection and traffic accounting for the subscriber.

Subscriber services and accounting are provided in situations where a subscriber has already been assigned an IP addresses prior to reaching the parent circuit.

Disclosed is a method for providing virtual channelization of un-channelized media, according to one embodiment. A parent circuit is configured to expect dynamic IPoE CLIPS clients. Configuring the parent circuit to expect dynamic IPoE CLIPS clients includes providing a new rule to an existing service-policy framework that allows source Internet Protocol (IP) address ranges to be configured on the parent circuit.

Traffic having a source address is received from an access point. The access point can be, for example, a WiFi access point. The parent circuit determines whether the source address of the traffic falls within a predefined range of addresses. In one embodiment, the range of addresses is a dynamic IPoE CLIPS range.

A circuit lookup is performed based on the source address. Upon a determination from the circuit lookup that a circuit corresponding to the traffic from the source address does not exist, the parent circuit determines whether the source address of the traffic falls within a predefined range of addresses and notifies a control plane of the parent circuit that a new IP address has been detected for dynamic IPoE CLIPS.

In one embodiment, packets of the received traffic are received on a forwarding plane of the parent circuit. The forwarding plane performs Reverse Path Forwarding on the source address. The forwarding plane determines that there is no route for the source address.

The forwarding plane notifies a control plane of the parent circuit that a new Internet Protocol (IP) address has been detected for dynamic IPoE CLIPS. A subscriber circuit is created for the traffic when the source address of the received traffic falls within the predefined range. In one embodiment, the control plane validates that there is no associated circuit for the new IP address and creates the subscriber circuit. A first packet of the received traffic triggers creation of the subscriber circuit and subsequent packets for the subscriber circuit are dropped until circuit creation is complete. In one embodiment, traffic outside the predefined address range is dropped (other embodiments do not always drop such traffic but first check whether or not other operations are applicable to such traffic).

In one embodiment, authentication and authorization is performed for the subscriber circuit. Upon successful authentication, the subscriber circuit is installed and provisioned in a forwarding plane of the parent circuit. In one embodiment authentication and authorization is performed using an authentication, authorization, and accounting (AAA) server.

In one embodiment, the subscriber circuit is used for service selection. The service selection can be applied using different profiles or attributes based on a subscriber record.

In one embodiment, the subscriber circuit is used for traffic accounting. The subscriber circuit is deleted once a threshold idle time is reached. An idle traffic timeout mechanism can be used for circuit deletion. Active traffic timeouts, session lifetime timeouts, traffic volume limits, time of day, day of week, or other triggers can also be used for circuit deletion. Traffic accounting is stopped once the subscriber circuit is deleted.

Also disclosed is an apparatus for providing virtual channelization of un-channelized media, according to one embodiment. The apparatus includes a parent circuit configured to expect dynamic Internet Protocol over Ethernet (IPoE) Clientless Internet Protocol Service (CLIPS) clients. The parent circuit receives traffic having a source address from an access point. The parent circuit determines whether the source address of the traffic falls within a predefined range of addresses. The parent circuit creates a subscriber circuit for the traffic when the source address of the received traffic falls within the predefined range.

Abbreviations used herein include: AAA: authentication, authorization and accounting; CLIPS: Clientless IP Service; and BNG: Broadband Network Gateway; LAG: link aggregation; IP and IP address imply any version of the Internet Protocol and associated addresses; DHCP implies either DHCP or DHCPv6; IPoE: Internet Protocol over Ethernet.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DESCRIPTION OF EMBODIMENTS

Figure 1:
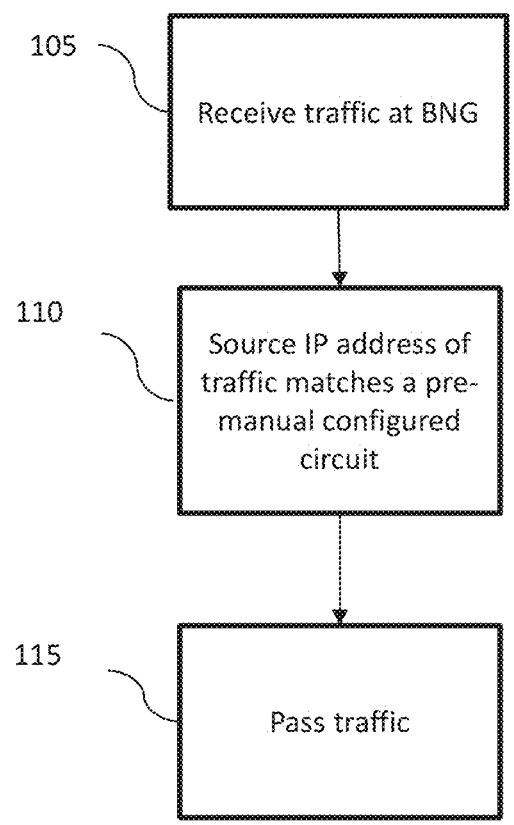
FIG. 1 illustrates an example flow diagram of a prior art system using static CLIPS.
Figure 2:
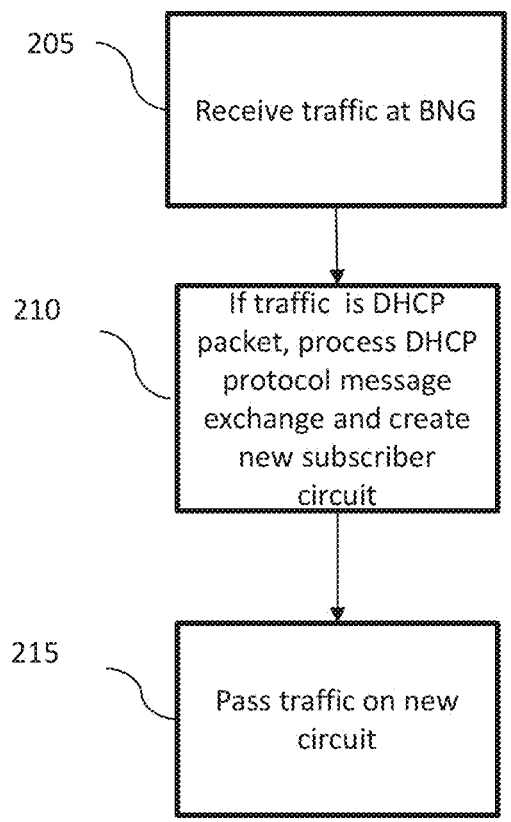
FIG. 2 illustrates an example flow diagram of a prior art system using dynamic DHCP CLIPS.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Disclosed is a novel way to create dynamic IPoE CLIPS circuits based on traffic sourced from different addresses and independent of the DHCP protocol. The new circuit behaves exactly as the DHCP CLIPS circuit except that the creation and deletion of the circuit is independent of the DHCP protocol. Disclosed is a circuit that also behaves exactly as the static CLIPS circuit except that the creation and deletion of the circuit is independent of manual configuration. The new circuit is then used for applying different profiles/attributes based on a subscriber record for service selection and traffic accounting. Traffic accounting includes (but is not limited to) reporting to management stations (either directly or via intermediate agents) information relating the traffic usage of a circuit. Such information can include octet and packet counts (ingress and egress), in total, and/or subdivided into Layer 2 traffic, Layer 3 traffic, control traffic, user traffic, etc. Such information is typically used to determine network usage, traffic engineering requirements, billing, SLA conformance, etc.

More specifically, the present disclosure provides an enhancement to existing CLIPS functionality in order to support WiFi customers in a specific network scenario. The customer in the network obtains the IP address from a DHCP server (or by any other mechanism which does not involve the network element) and the network element, e.g., a parent circuit, is not aware of the address during the discovery phase i.e. the network element doesn't sit in the path of DHCP message flow. The first thing that the network element sees is the traffic sourced from the IP address and based on this the network element creates a new circuit for the subscriber. As the network element sees traffic sourced from different IP addresses, the network element dynamically creates a new circuit for each new address. This circuit is the subscriber circuit and subscriber profile/attributes can be applied on this circuit for service selection and traffic accounting. Since no protocol is involved in either creation or deletion of circuit, an idle traffic timeout (or other trigger) mechanism is used for circuit deletion.

Figure 3:
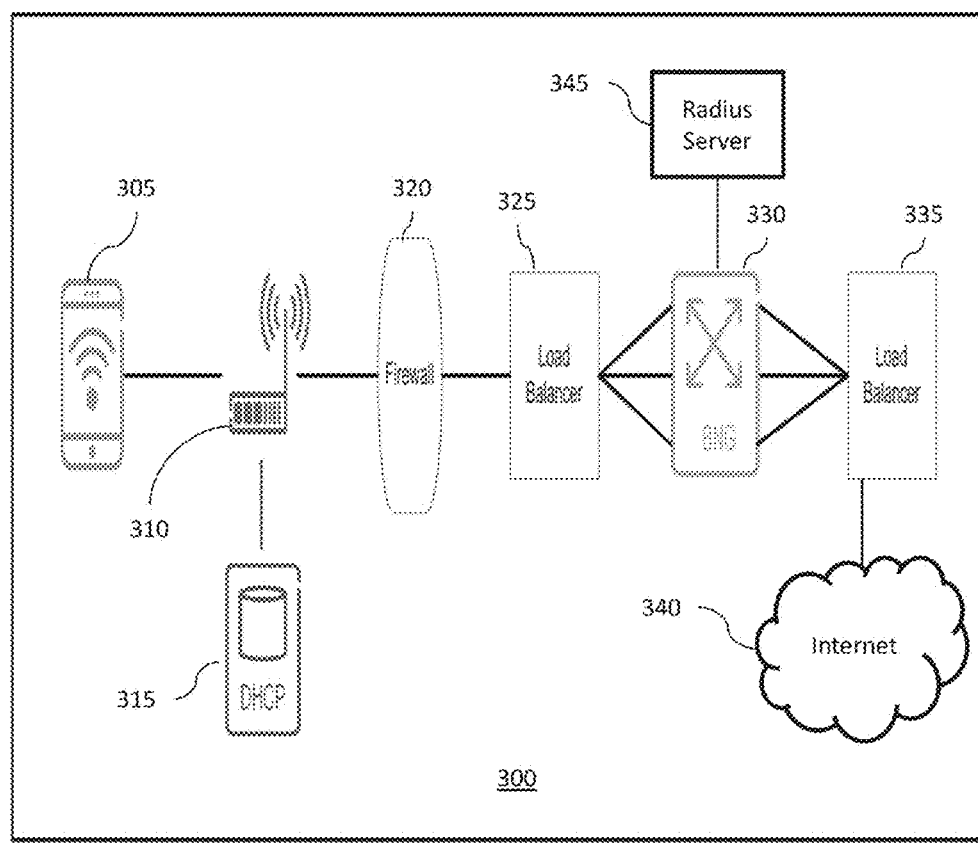
FIG. 3 illustrates a WiFi access network 200 according to one embodiment.

FIG. 3 illustrates a WiFi access network 300, according to one embodiment. WiFi access network includes a client device 305, an access point 310, a DHCP server 315, a firewall 320, a parent circuit, e.g., BNG 330, a load balancer 325 for traffic provided to an ingress of parent circuit 330, and a load balancer 335 for traffic from an egress of parent circuit 330. As shown in FIG. 3, the WiFi client(s) 305 and DHCP server 315 sit on one side of firewall 320 and network element, e.g., parent circuit 330, sits on the other side of firewall 320. The network element 330 is not aware of the WiFi client address during the DHCP address negotiation phase. The first thing the network element sees from the client 305 is the traffic towards the Internet 340. On first noticing the new client traffic, the network element 330 creates the circuit for the client 305 and this circuit is then used to carry the client traffic.

A radius server 345 is used to authenticate and authorize the created circuit. Authentication and authorization can be provided, for example, by an authentication, authorization, and accounting (AAA) server.

The circuit gets torn down and deleted from the system if the network element doesn't see any traffic for some specific period of time. The time is configurable and it could be same or different for each circuit.

Figure 4:
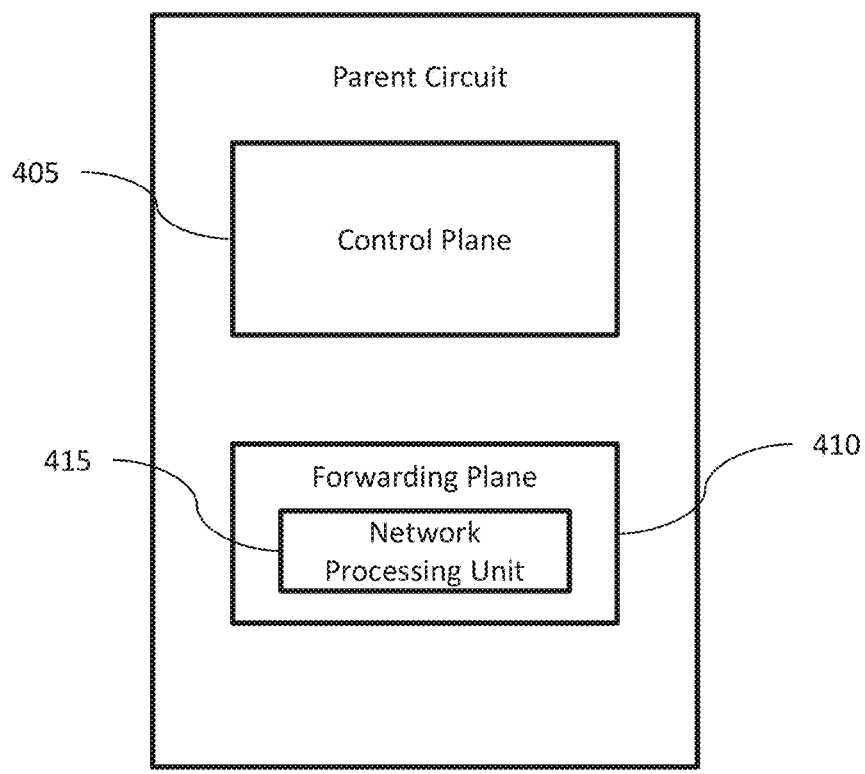
FIG. 4 illustrates a parent circuit according to one embodiment.

FIG. 4 illustrates a parent circuit according to one embodiment. Parent circuit 330 includes a control plane 405, a forwarding plane 410, and a network processing unit (NPU) 415 of the forwarding plane 410.

In one embodiment, the parent circuit 330 is configured to expect dynamic IPoE CLIPS clients. Data packets are received on the forwarding plane 410 of parent circuit 330. The forwarding plane 410 performs Reverse Path Forwarding (RPF) on an incoming packet source IP address and determines that there is no route for this IP address. The forwarding plane 410 also validates that the source IP address falls within a configured dynamic IPoE CLIPS range. The forwarding plane 410 notifies the control plane 405 that a new IP address has been detected for dynamic IPoE CLIPS. In other words, the forwarding plane packet processing network processing unit (NPU) 415 performs the source address lookup for the packets received on the parent circuit 330 and upon finding no circuit for the address, sends this information to the control plane 405. The control plane 405 validates that the new IP address does not have an associated circuit and creates a new subscriber circuit, e.g. virtual channel.

Figure 5:
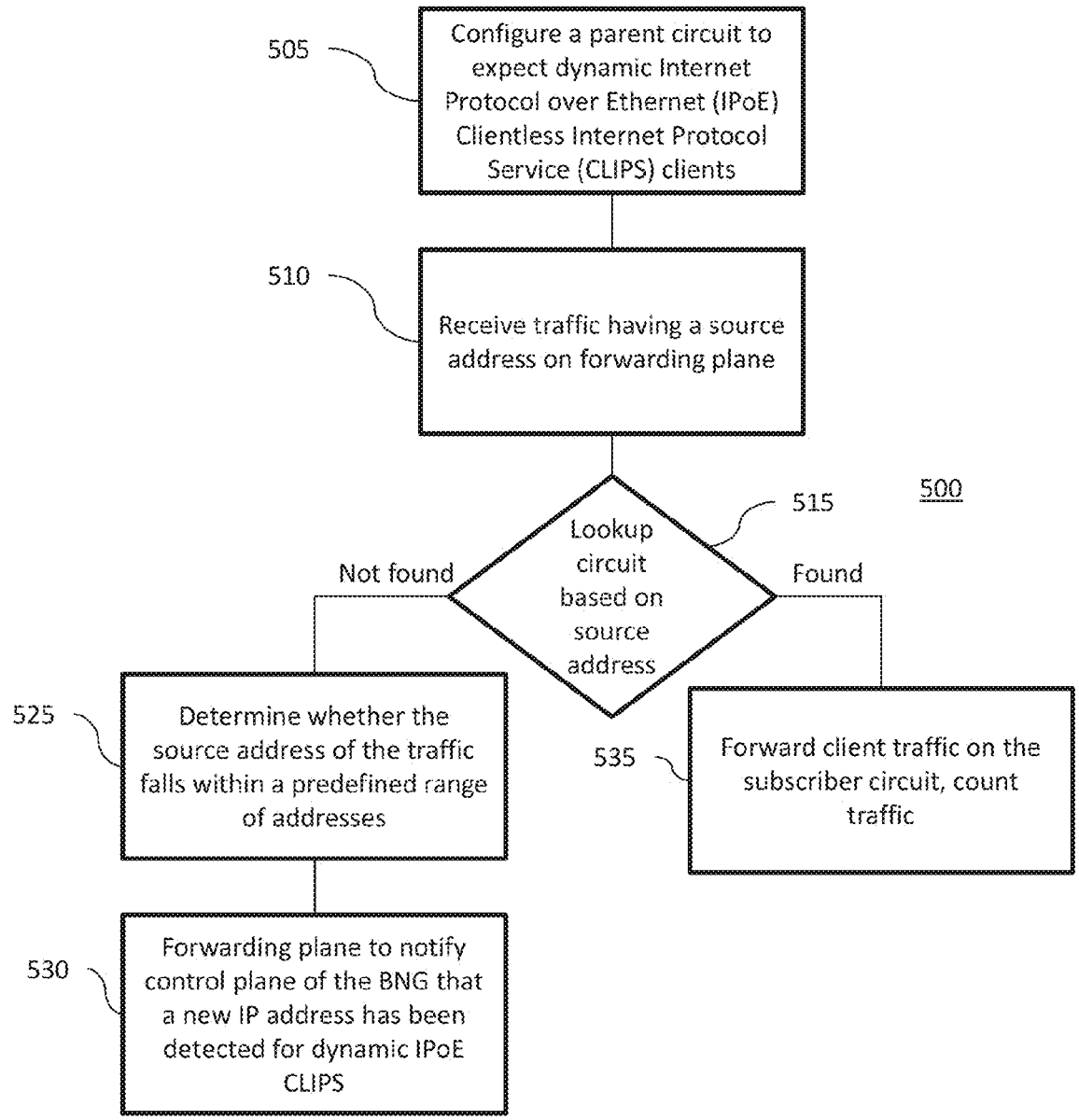
FIG. 5 illustrates a block diagram of a method for providing virtual channelization of un-channelized media according to one embodiment.

FIG. 5 illustrates a block diagram of a method 500 for providing virtual channelization of un-channelized media, according to one embodiment. At block 505, a parent circuit is configured to expect dynamic IPoE CLIPS clients. Configuring the parent circuit to expect dynamic IPoE CLIPS clients includes providing a new rule to an existing service-policy framework that allows source Internet Protocol (IP) address ranges to be configured on the parent circuit.

At block 510, traffic having a source address is received from an access point on a forwarding plane of the parent circuit. The access point can be, for example, a WiFi access point.

At block 515, a circuit lookup based on the source address is performed. When a circuit corresponding to the source address is not found, at block 525, the parent circuit determines whether the source address of the traffic falls within a predefined range of addresses. In one embodiment, the range of addresses is a dynamic IPoE CLIPS range.

In one embodiment, packets of the received traffic are received on a forwarding plane of the parent circuit. The forwarding plane performs Reverse Path Forwarding on the source address. The forwarding plane determines that there is no route for the source address.

At block 530, The forwarding plane notifies a control plane of the parent circuit, e.g., BNG, that a new Internet Protocol (IP) address has been detected for dynamic IPoE CLIPS. A subscriber circuit is created for the traffic when the source address of the received traffic falls within the predefined range. In one embodiment, the control plane validates that there is no associated circuit for the new IP address and creates the subscriber circuit. A first packet of the received traffic triggers creation of the subscriber circuit and subsequent packets for the subscriber circuit are dropped until circuit creation is complete. In one embodiment, traffic outside the predefined range is dropped.

When a circuit corresponding to the source address of the traffic is found, the traffic is forwarded on the pre-existing circuit at block 535. In one embodiment, traffic is counted.

In one embodiment, authentication and authorization is performed for the subscriber circuit. Upon successful authentication, the subscriber circuit is installed and provisioned in a forwarding plane of the parent circuit. In one embodiment authentication and authorization is performed using an authentication, authorization, and accounting (AAA) server.

In one embodiment, the subscriber circuit is used for service selection. The service selection can be applied using different profiles or attributes based on a subscriber record.

In one embodiment, the subscriber circuit is used for traffic accounting. The subscriber circuit is deleted once a threshold idle time is reached. An idle traffic timeout mechanism can be used for circuit deletion. Traffic accounting is stopped once the subscriber circuit is deleted.

Figure 6:
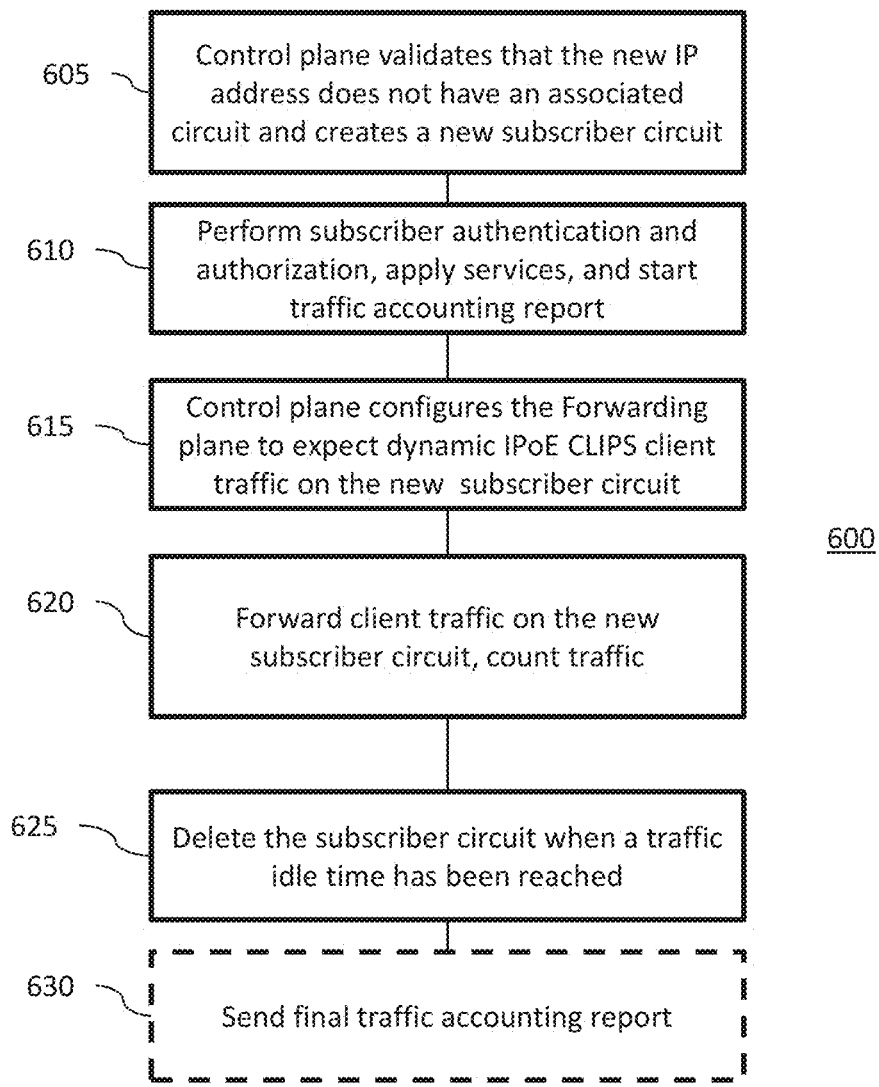
FIG. 6 illustrates a block diagram of a method for providing virtual channelization of un-channelized media according to one embodiment.

FIG. 6 illustrates a block diagram of a method 600 for providing virtual channelization of un-channelized media, according to one embodiment. Dynamic virtual channelization can be enabled on the parent circuit (which could be port or dot1q or QinQ or LAG) using a command line interface (CLI) command "service clips auto-detect".

At block 605, the control plane of the parent circuit validates that the new IP address does not have an associated circuit and creates a new subscriber circuit. A data packet is received on a forwarding plane of a BNG. The forwarding plane is used to perform Reverse Path Forwarding (RPF) on the incoming packet source IP address. The forwarding plane determines that there is no route for this IP address. In addition, the forwarding plane validates that the source IP address falls within the configured dynamic IPoE CLIPS range. The forwarding plane is used to notify a control plane of the BNG that a new IP address has been detected for dynamic IPoE CLIPS. The control plane validates that the new IP address does not have an associated circuit and creates a new subscriber circuit, e.g., virtual channel.

At block 610, subscriber authentication and authorization is performed, services are applied, and, optionally, traffic accounting is started, e.g., when the BNG is configured to handle traffic accounting. Services applied include, but are not limited to, Quality of Service (QoS), HyperText transfer Protocol (HTTP) Redirect, Access Control Lists (ACLs), Policy Based Routing (PBR), filtering, mirroring, etc. At block 615, the control plane configures the forwarding plane to expect dynamic IPoE CLIPS client traffic on the new subscriber circuit. At block 620, client traffic is forwarded on the new subscriber circuit and traffic is counted (when traffic accounting is implemented). At block 625, the subscriber circuit is deleted when a traffic idle time is reached. At block 630, traffic accounting is stopped when the BNG is configured for traffic accounting.

In other words, the forwarding plane packet processing network processing unit (NPU) performs the source address lookup for the packets received on the parent circuit and on finding no circuit for the address, sends this information to the control plane. After verifying the uniqueness of the subscriber, the control plane creates a new subscriber circuit. This subscriber circuit is authenticated and authorized from, e.g., an AAA server. On successful authentication, the circuit gets installed and provisioned in the forwarding plane.

In one embodiment, a configuration of a parent circuit can be implemented using a CLI or graphical user interface (GUI) to enable the virtual channelization feature on the parent circuit. The parent circuit can be implemented to run port, LAG, IEEE 802.1Q, and/or IEEE 802.1QinQ level protocols. A new rule is added to the existing service-policy framework, in global mode, for configuring source IP address ranges allowed on the parent circuit. The rule can be implemented, for example, using the following command:
service-policy name <policy-name>
[no] allow clips ip range <start-address> <end-address>
The range of IP addresses for which the dynamic IPoE CLIPS service is valid is represented by: ip range <start address> <end-address>. The traffic outside the range is silently dropped.

In order to apply or remove a service policy on a parent circuit, the following command is used:
port ethernet <slot/port>
......................................
[no] service clips auto-detect [direct] [maximum <max-num>] context <ctx-name> service-policy <policy-name>
The command that enables the forwarding plane to detect packets that fall within the predefined range and find the corresponding subscriber circuit entry is represented by: service clips auto-detect [direct] [maximum <max-num>] context <ctx-name> service-policy <policy-name>. When no corresponding subscriber circuit entry is found, an event is generated and, based on that event, the control plane creates a dynamic subscriber circuit.

The parent circuit is either connected to a layer 2 (L2) gateway (directly connected clients) or layer 3 (L3) gateway (indirectly connected clients), but not both at the same time. The keyword direct means directly connected client. By default clients are indirectly connected.

Maximum is the maximum number of sessions allowed on the parent circuit. The range of values supported is 1 to 32000 and the default value is 32000.

In one embodiment, a range check of IP addresses is not enforced in the configuration and parent circuits can have overlapping ranges as multiple parent circuits can be connected through a load balancer and any parent circuit can receive a packet in that range. Even though overlapping ranges allow the same address on different circuits, the control plane enforces that only one subscriber session comes up for a given IP address.

In one embodiment, the control plane enforces a rule that multiple subscribers do not receive or are not assigned the same IP address on two different parent circuits. In this manner, if multiple requests come for the same IP address on different parent circuits only the first request is authorized and all remaining requests are denied.

In one embodiment, the source IP address from the ingress packet is used as the subscriber name/username in the authentication request and the packet source IP address is also the IP address assigned to the subscriber. If, for some reason, the subscriber profile IP address does not match the IP address in the authentication request, the request will be denied (authentication failure) and the control plane will notify the forwarding plane of the failure. Such notification occurs for a variety of failure cases, including, but not limited to, authorization failure.

In one embodiment, the first packet from the configured source IP address range triggers the circuit creation and subsequent packets coming from the same source IP address will be dropped until the circuit creation is complete. When the circuit creation fails, the next packet would trigger the circuit creation again.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more buses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for providing virtual channelization of un-channelized media, which comprises:
    configuring a parent circuit to expect traffic from one or more dynamic Internet Protocol over Ethernet (IPoE) Clientless Internet Protocol Service (CLIPS) clients over a predefined range of IP addresses;
    receiving traffic having a source address from an access point;
    performing a circuit lookup based on the source address; and
    upon finding from the circuit lookup that a circuit corresponding to the traffic from the source address does not exist:
        determining whether the source address of the traffic falls within the predefined range of IP addresses; and
        responsive to the determining, notifying a control plane of the parent circuit that a new IP address within the predefined range of IP addresses has been detected for dynamic IPoE CLIPS.

2. The method of claim 1, wherein packets of the received traffic are received on a forwarding plane of the parent circuit.

3. The method of claim 2, wherein the forwarding plane performs Reverse Path Forwarding on the source address.

4. The method of claim 3, wherein the forwarding plane determines that there is no route for the source address.

5. The method of claim 4, wherein the forwarding plane notifies the control plane of the parent circuit that the source address is a new Internet Protocol (IP) address.

6. The method of claim 5, wherein the control plane validates that there is no associated circuit for the new IP address and creates a subscriber circuit.

7. The method of claim 2, wherein a first packet of the received traffic triggers creation of a subscriber circuit and subsequent packets are dropped until circuit creation is complete.

8. The method of claim 1, which further comprises performing authentication and authorization for a subscriber circuit.

9. The method of claim 8, wherein authentication and authorization is performed using an authentication, authorization, and accounting (AAA) server.

10. The method of claim 8, wherein upon successful authentication, the subscriber circuit is installed and provisioned in a forwarding plane of the parent circuit.

11. The method of claim 1, which further comprises using a subscriber circuit for service selection.

12. The method of claim 11, wherein the service selection is applied using different profiles or attributes based on a subscriber record.

13. The method of claim 1, which further comprises using a subscriber circuit for traffic accounting.

14. The method of claim 13, wherein the subscriber circuit is deleted once a threshold idle time is reached.

15. The method of claim 14, wherein an idle traffic timeout mechanism is used for circuit deletion.

16. The method of claim 14, wherein traffic accounting is stopped once the subscriber circuit is deleted.

17. The method of claim 1, wherein configuring the parent circuit to expect dynamic IPoE CLIPS clients comprises adding a new rule to an existing service-policy framework for configuring source Internet Protocol (IP) address ranges allowed on the parent circuit.

18. The method of claim 1, wherein traffic outside the predefined range is dropped.

19. An apparatus for providing virtual channelization of un-channelized media, comprising:
    a parent circuit configured to:
        expect traffic from one or more dynamic Internet Protocol over Ethernet (IPoE) Clientless Internet Protocol Service (CLIPS) clients over a predefined range of IP addresses;
        receive traffic having a source address from an access point;
        perform a circuit lookup based on the source address; and
        upon finding from the circuit lookup that a circuit corresponding to the traffic from the source address does not exist:
            determine whether the source address of the traffic falls within the predefined range of IP addresses; and
            responsive to the determining, notifying a control plane of the parent circuit that a new IP address within the predefined range of IP addresses has been detected for dynamic IPoE CLIPS.

* * * * *